US011985102B2

(12) United States Patent
Wolf et al.

(10) Patent No.: US 11,985,102 B2
(45) Date of Patent: May 14, 2024

(54) PROCESSING CLUSTERS WITH MATHEMATICAL MODELS FOR MESSAGE SUGGESTION

(71) Applicant: ASAPP, INC., New York, NY (US)

(72) Inventors: William Abraham Wolf, Salt Lake City, UT (US); Melanie Sclar, Ciudad Autónoma de Buenos Aires (AR); Clemens Georg Benedict Rosenbaum, Brooklyn, NY (US); Christopher David Fox, Mastic, NY (US); Kilian Quirin Weinberger, Ithaca, NY (US)

(73) Assignee: ASAPP, INC., New York, NY (US)

( * ) Notice: Subject to any disclaimer, the term of this patent is extended or adjusted under 35 U.S.C. 154(b) by 16 days.

(21) Appl. No.: 17/246,263

(22) Filed: Apr. 30, 2021

(65) Prior Publication Data

US 2022/0353222 A1 Nov. 3, 2022

(51) Int. Cl.
*G06F 15/16* (2006.01)
*G06N 3/04* (2023.01)
*H04L 51/214* (2022.01)

(52) U.S. Cl.
CPC ............. *H04L 51/214* (2022.05); *G06N 3/04* (2013.01)

(58) Field of Classification Search
CPC ................................ H04L 51/214; G06N 3/04
USPC .................................................. 709/204, 206
See application file for complete search history.

(56) References Cited

U.S. PATENT DOCUMENTS 11,216,510 B2 1/2022 Jiang et al.
2014/0372346 A1* 12/2014 Phillipps ................ G06N 20/00 706/12
2017/0154244 A1* 6/2017 Brendel ................. G06V 20/20
2018/0032884 A1* 2/2018 Murugeshan ........... G06F 40/35
2018/0322403 A1* 11/2018 Ron ....................... G06Q 10/10
2019/0243811 A1* 8/2019 Asai ....................... G06N 20/00
2020/0019609 A1 1/2020 Yu et al.
2020/0042613 A1 2/2020 Jiang et al.
2020/0327555 A1* 10/2020 Sapoznik .............. G06F 40/216
(Continued)

OTHER PUBLICATIONS

Morde, Vishal , et al., "XGBoost Algorithm: Long May She Reign!", https://towardsdatascience.com/https-medium-com-vishalmorde-xgboost-algorithm-long-she-may-rein-edd9f99be63d, Apr. 7, 2019, 10 pages.
(Continued)

*Primary Examiner* — Imad Hussain
(74) *Attorney, Agent, or Firm* — GTC Law Group PC & Affiliates

(57) ABSTRACT

A message suggestion service may use clusters of pre-approved messages to improve the quality of messages suggested to users. During a conversation, messages of the conversation may be processed with a neural network to compute a conversation encoding vector. The neural network may also be used to compute pre-approved message encoding vectors of the pre-approved messages. Distances between the conversation encoding vector and the pre-approved message encoding vectors may be used to select one or more clusters. Distances between the conversation encoding vector and the pre-approved message encoding vectors may then be used to select one or more pre-approved messages from the selected clusters. The selected pre-approved messages may then be presented as suggested messages to a user.

19 Claims, 12 Drawing Sheets

(56) References Cited

U.S. PATENT DOCUMENTS

| | | | | |
|---|---|---|---|---|
| 2021/0126881 | A1 | 4/2021 | Ball et al. | |
| 2021/0357378 | A1* | 11/2021 | Urdiales | G06F 16/2237 |
| 2023/0186107 | A1* | 6/2023 | Phan | G06F 18/24323 706/45 |

OTHER PUBLICATIONS

Swanson, Kyle , et al., "Building a Production Model for Retrieval-Based Chatbots", arXiv:1906.03209v2 [cs.CL], https://arxiv.org/pdf/1906.03209.pdf (accessed Dec. 16, 2022), Aug. 1, 2019, 10 pages.

* cited by examiner

PROCESSING CLUSTERS WITH MATHEMATICAL MODELS FOR MESSAGE SUGGESTION

BACKGROUND

Mathematical models may provide advanced features to enhance applications, such as a messaging system that suggests responsive messages based on previous messages in a conversation. For some applications, it may be desired to update or retrain the mathematical models on a regular basis to account for new data or to keep the application up to date.

Some mathematical models, however, may require significant time and computational resources to retrain. For example, a large mathematical model may require a week to retrain. Accordingly, applications that use large mathematical models may be limited in the frequency in which the large mathematical models may be updated.

It may be desired to have an application that is able to take advantage of the benefits of a large mathematical model but also to update the application without requiring significant computational resources.

BRIEF DESCRIPTION OF THE FIGURES

The invention and the following detailed description of certain embodiments thereof may be understood by reference to the following figures.

DETAILED DESCRIPTION

People may exchange messages with each other using a variety of techniques and in a variety of situations. For example, a person may type or speak a message to an app running on his or her device, type or speak a message on a web page, send a text message, or send an email. As used herein, a text message includes any message sent as text including but not limited to a message sent using SMS (short message service) or a special-purpose application (e.g., Facebook messenger, Apple iMessage, Google Hangouts, or WhatsApp). People may exchange messages for any appropriate purpose, such as social interactions, business interactions, or to request customer support from a company. The techniques described herein are not limited to any manner of or purpose for exchanging messages.

Entering a message may be cumbersome as compared to speaking directly with a person. For example, entering a message with a keyboard, touchscreen, or even dictating a message using automatic speech recognition may take more time and attention than desired and may contain errors or typos. Message entry through a limited interface, such as with a mobile device, may make these challenges even more acute, and may introduce other challenges for the user to send a message as intended (e.g., due to difficulty in reading the intended message and/or correcting errors after initial entry).

To facilitate the process of entering a message and/or ensuring that an entered message is correct, one or more suggested messages may be presented to a person. Messages may be suggested to a person based on the context of the conversation. For example, a user may receive a message "How are you?" and a suggested response may be "I am fine." These suggested messages may be updated throughout the conversation as additional messages are exchanged.

The process of suggesting messages may be implemented with a message suggestion service that may use a mathematical model to process previous messages of a conversation and suggest one or more messages to a user that the user may select and send to another person.

The techniques described herein may use any of the techniques described in U.S. patent application Ser. No. 16/035,062; U.S. patent application Ser. No. 16/054,473; and U.S. patent application Ser. No. 16/663,872; each of which is incorporated herein by reference.

Figure 1:
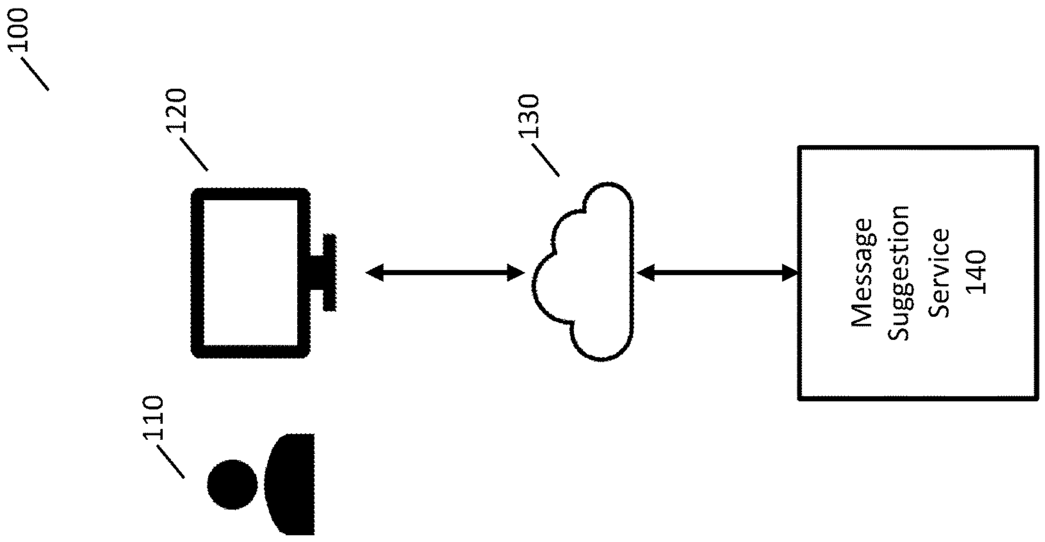
FIG. 1 is an example system for implementing a message suggestion service.

FIG. 1 is an example system 100 for allowing a user to use a message suggestion service when sending messages to another person. In FIG. 1, user 110 may use user device 120 to communicate with one or more other users not shown in FIG. 1. User device 120 may be any appropriate device, such as a computer or a mobile phone. User 110 may be using any appropriate application to send messages on user device 120 that allows accessing received messages and transmitting messages to other users.

User device 120 may have access to message suggestion service 140 to make it easier for user 110 compose and send messages. In some implementations, message suggestion service 140 may be implemented within user device 120. In some implementations, user device 120 will access message suggestion service 140 via a network, such as network 130. Network 130 may include any appropriate network, such as the Internet or a mobile data network.

Message suggestion service 140 may process one or more messages of a conversation with a mathematical model and determine one or more suggested messages to be presented to user 110. Message suggestion service 140 may use any appropriate techniques, such as any of the techniques described herein. User 110 may then select a suggested message to cause it to be transmitted in a conversation. This process may be repeated during the conversation.

Figure 2:
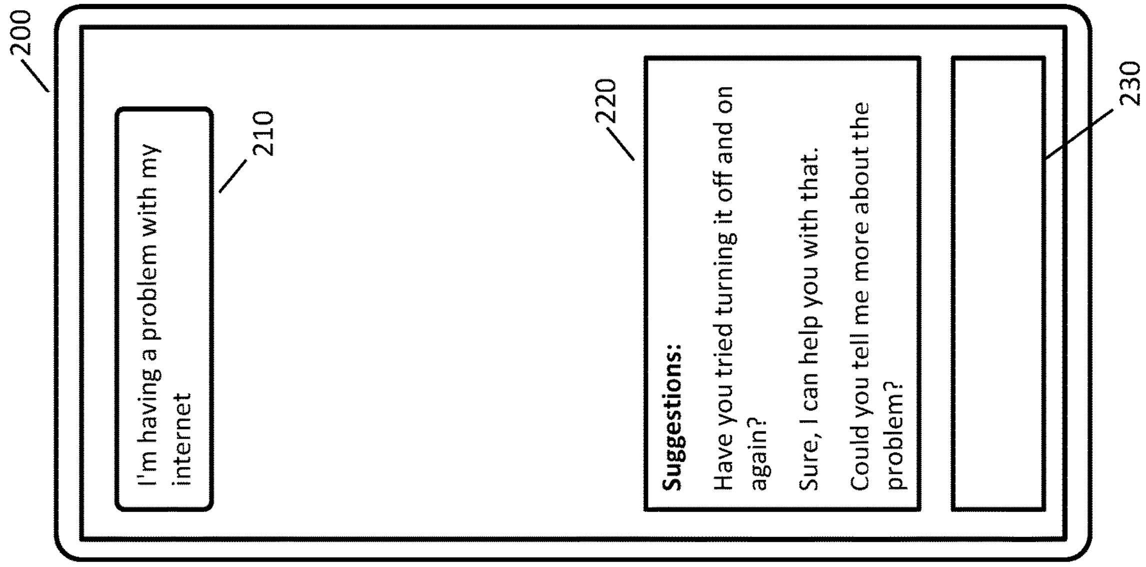
FIG. 2 is an example user interface for presenting suggested messages to a user.

FIG. 2 is an example user interface for presenting suggested messages to a user. In FIG. 2, user interface 200 may be presented on any appropriate device, such as user device 120. User interface 200 shows a received message 210 in a conversation. In this example, received message 210 may relate to technical support. Message suggestion service 140 may process the received message and present suggested messages 220. In this example, three suggested messages are presented. A user may select a suggested message to cause that message to be transmitted to the other user. If the user does not want to use any of the suggested messages, the user can enter a message in text entry box 230.

In some implementations, the suggested messages may be selected from a set of pre-approved messages. A set of pre-approved messages may include all messages that may be suggested to a user. For example, where messages are suggested in the context of a customer seeking support from a company, the set of pre-approved messages may include a number of most common messages from logs of customer support sessions. The number of pre-approved messages may be small or large, such as obtaining 10,000 pre-approved messages from customer support logs. As described in greater detail below, a mathematical model (such as an artificial neural network) may process previous messages in a conversation to select one or more pre-approved messages as suggestions for a user.

In some implementations, suggested messages may be selected from the set of pre-approved messages using conversation encodings and pre-approved message encodings. The messages of a conversation may be processed with a mathematical model to compute a conversation encoding vector that represents the meaning of the conversation. Similarly, the pre-approved messages may be processed to compute a pre-approved message encoding vector for each pre-approved message. A distance between the conversation encoding vector and the pre-approved message encoding vectors may be used to select a pre-approved message as a suggested message for a user.

Figure 3:
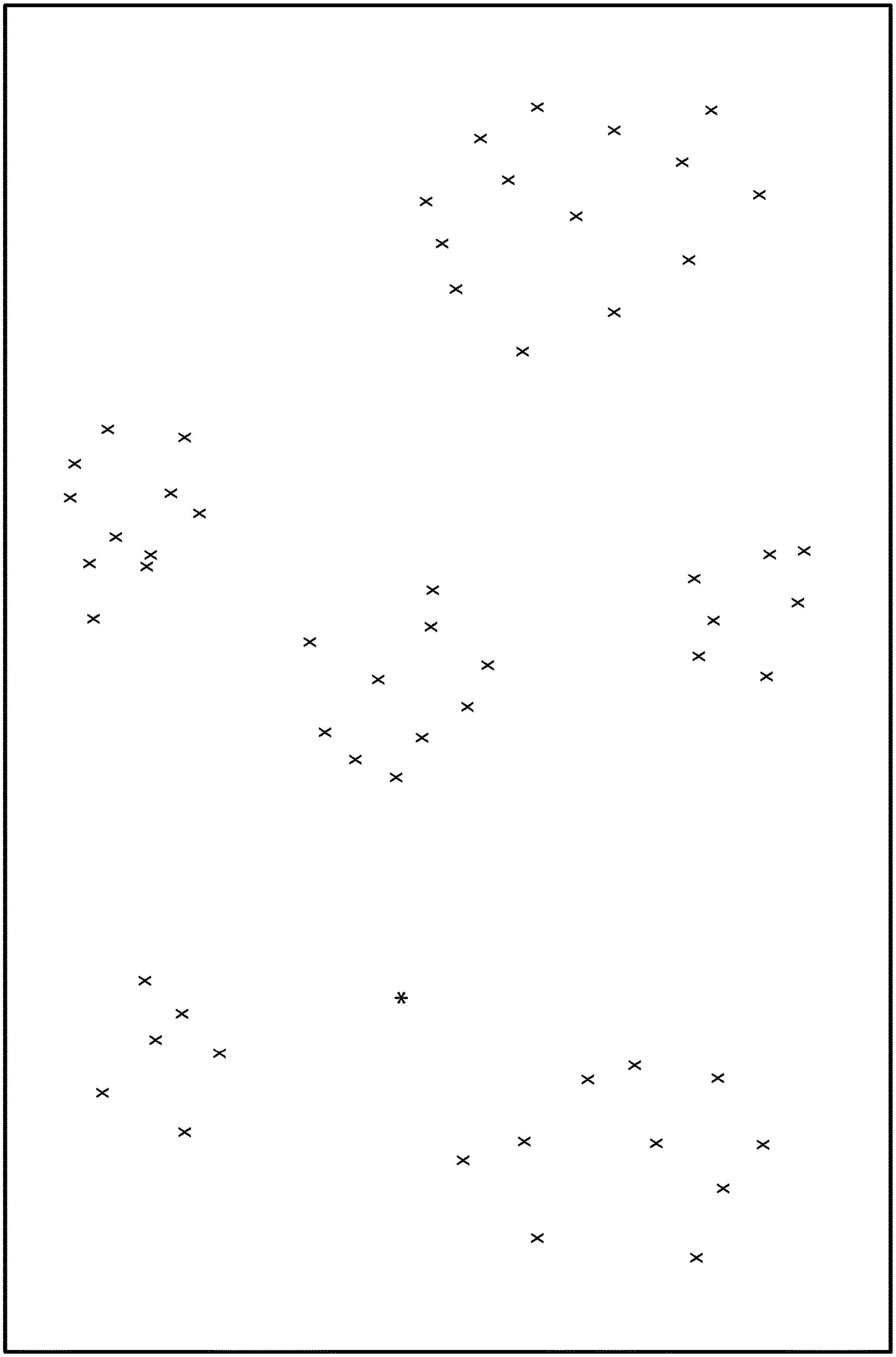
FIG. 3 illustrates a conceptual representation of a conversation encoding and pre-approved message encodings in a vector space.

FIG. 3 illustrates a conceptual representation of a conversation encoding and pre-approved message encodings in a vector space. For clarity of presentation, the encodings are shown in a two-dimensional vector space, but encodings may use larger vector spaces, such as a 128-dimensional vector space or a 512-dimensional vector space. In the example of FIG. 3, each “x” represents a pre-approved message encoding that was computed from a pre-approved message, and the “*” represents a conversation encoding of a conversation from which it is desired to suggest messages to a user.

The conversation encodings and pre-approved message encodings may be computed so that pre-approved messages that are a good match for a conversation will have message encodings that are close to the conversation encoding of the conversation. Conversely, pre-approved messages that are not a good match for a conversation will have message encodings that are farther from the conversation encoding of the conversation. Accordingly, to select pre-approved messages as suggested messages for a conversation, the distances between message encodings and conversation encodings may be used to select pre-approved messages that are a good match for the conversation.

Figure 4:
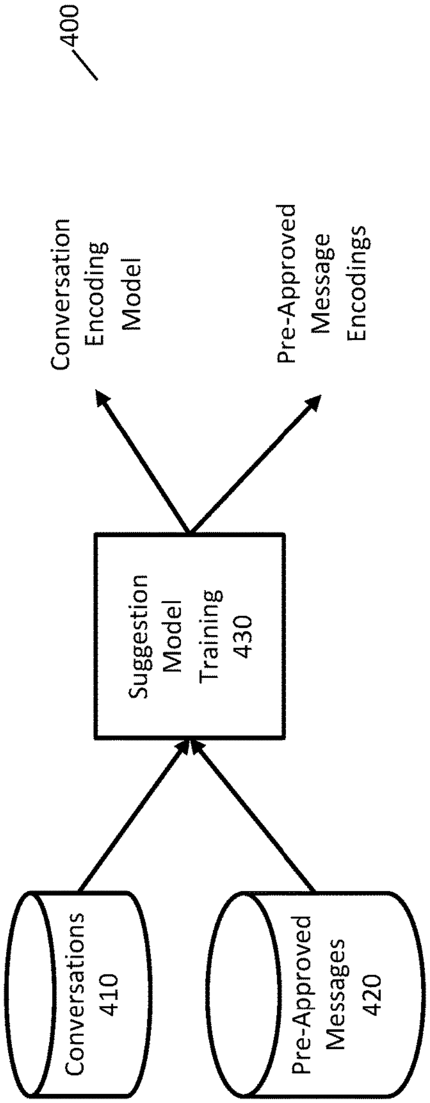
FIG. 4 is an example system for training a mathematical model to suggest messages in a conversation.

FIG. 4 is an example system 400 that may be used to generate (i) a conversation encoding model that may process messages of a conversation to compute a conversation encoding vector for the conversation and (ii) pre-approved message encoding vectors for a set of pre-approved messages.

In FIG. 4, suggestion model training component 430 implements a training process to train parameters of one or more mathematical models. This training process using a training corpus of conversations, such as conversations stored in conversations data store 410. Suggestion model training component 430 may also process a set of pre-approved messages, such as the pre-approved messages in pre-approved messages data store 420 to compute a pre-approved message encoding vector for each of the pre-approved messages. Suggestion model training component 430 may be implemented using any appropriate techniques. For example, suggestion model training component 430 may train mathematical models using stochastic gradient descent.

Figure 5:
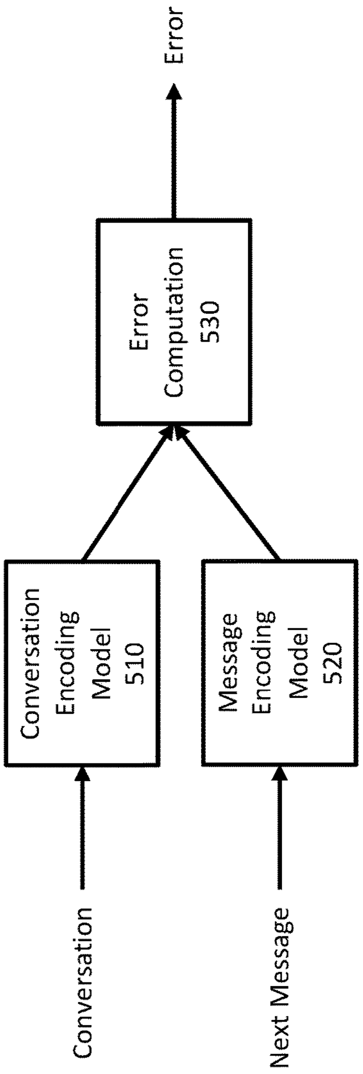
FIG. 5 illustrates components of an example implementation of a mathematical model to suggest messages in a conversation.

FIG. 5 illustrates components of an example implementation of suggestion model training component 430. FIG. 5 includes conversation encoding model 510 that processes text of a conversation to compute a conversation encoding vector that represents the meaning of the conversation. FIG. 5 also includes message encoding model 520 that processes text of a message to compute a message encoding vector that represents the meaning of the message. In some implementations, they may be implemented using neural networks, such as a recurrent neural network or a transformer neural network (e.g., BERT, ELMo, or GPT).

Conversation encoding model 510 and message encoding model 520 may be implemented using different techniques (e.g., different neural network architectures) and/or different parameters. The different implementations of conversation encoding model 510 and message encoding model 520 may account for differences in the data being processed (conversation versus a message) and also for the relationship between the data being processed (e.g., that the message is a next message in the conversation).

Suggestion model training component 430 may train parameters of conversation encoding model 510 and message encoding model 520 so that the corresponding conversation encoding vector and message encoding vector are close to each other when the message is a good suggestion for the conversation. During training, error computation 530 may compute an error value from the conversation encoding vector and message encoding vector (such as a distance between them). Any appropriate error values may be used, such as distance measure. The model parameters may then be updated to reduce the error value.

During a training process, suggestion model training component 430 may iterate over conversations in conversations data store 410 to train parameters of conversation encoding model 510 and message encoding model 520. A first conversation may be selected, and the first message of the conversation may be the conversation input to conversation encoding model 510 and the second message in the conversation may be input to message encoding model 520. An error may be computed, and the error may be used to update the model parameters.

This process may be repeated by using the first two messages of the first conversation as the input to conversation encoding model 510 and the third message in the first conversation as the input to message encoding model 520, and so forth. This process may also be repeated using other conversations in conversations data store 410.

In some implementations, the training process may also use negative examples. Instead of using the actual next message in the conversation as the input to message encoding model 520, a different message may be selected that is known to be a poor match for the conversation or is likely to be a bad match for the conversation (e.g., a randomly selected message). For the negative examples, the parameters may be updated to maximize the error instead of minimize the error. Using both positive examples (actual next messages in the conversations) and negative examples (e.g., random messages) may produce more accurate models.

In some implementations, the model parameters may be updated or trained for only one type of user in the conversation. For example, where the training data includes conversations between customers and customer support agent, the models may be trained only to suggest messages for agents. For another example, a first model may be trained to suggest messages for agents and a second model may be trained to suggest messages for customers.

After performing the training process, suggestion model training component 430 may output conversation encoding model 510 to be used in a production system. Suggestion model training component 430 may also process the pre-approved messages from pre-approved messages data store 420 with message encoding model 520 to compute pre-approved message encodings to be used in the production system.

Conversation encoding model 510 and message encoding model 520 may be may be referred to jointly as a neural network since the parameters of the two models may be trained together. When referred to as a neural network, a first portion of the neural network may be used to compute conversation encodings (e.g., conversation encoding model 510) and a second portion of the neural network may be used to compute message encodings (e.g., message encoding model 520).

Figure 6:
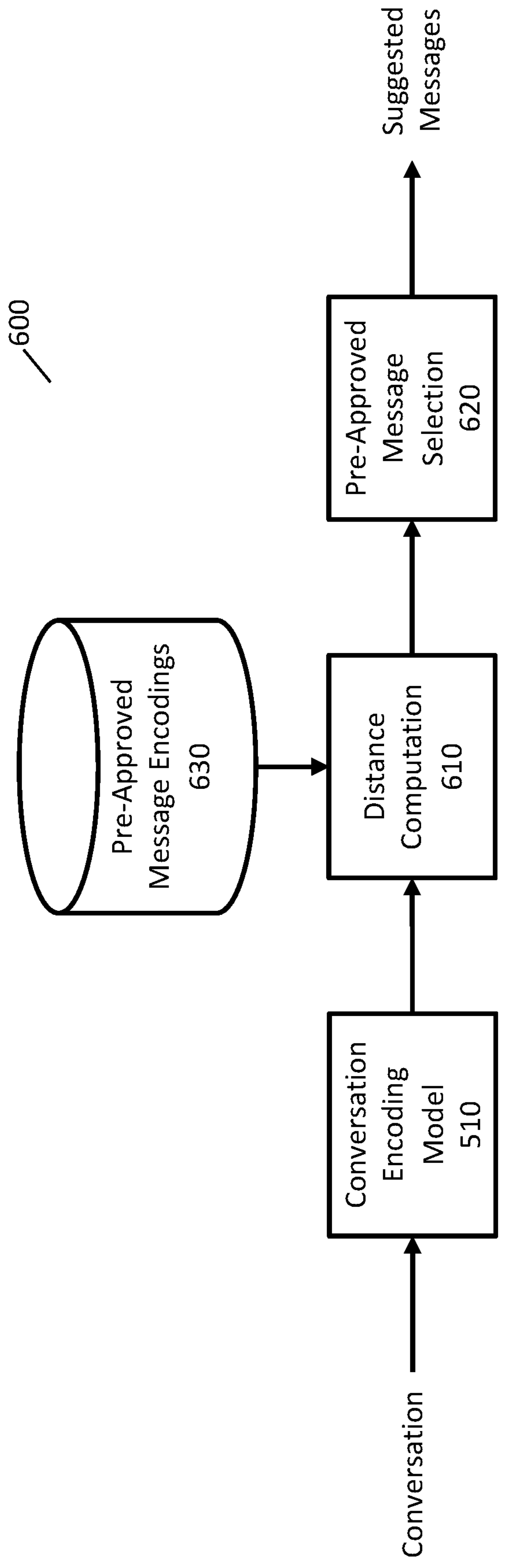
FIG. 6 is an example message suggestion system implemented using a conversation encoding model and pre-approved message encodings.

FIG. 6 is an example message suggestion system 600 implemented using a conversation encoding model and pre-approved message encodings. Message suggestion system 600 may be used during a conversation between two or more users. For example, each time a new message is received in the conversation, message suggestion system 600 may be used to suggest one or more next messages to a user.

In FIG. 6, text of the conversation so far may be input to conversation encoding model 510 to compute a conversation encoding vector that represents the conversation. Distance computation component 610 may receive the conversation encoding vector and compute distances between the conversation encoding vector and the pre-approved message encodings that may be obtained from a data store, such as pre-approved message encodings data store 630. As used herein, distance computation includes any appropriate techniques for computing a similarity between two vectors and a mathematical distance is not required. For example, distances may include a Euclidean distance or a cosine similarity.

Pre-approved message selection component 620 may receive the distances computed by distance computation component 610 and select one or more pre-approved messages as suggested messages for a user in the conversation. Pre-approved message selection component 620 may use any appropriate techniques for selecting pre-approved messages, such as selecting a number of pre-approved messages that are closest to the conversation encoding vector or selecting all pre-approved messages within a specified distance to the conversation encoding vector. The selected pre-approved messages may then be presented as suggestions to the user, such as shown in FIG. 2.

In some implementations, it may be desired to use additional techniques to obtain greater diversity in the suggested messages that are presented to a user. Selecting suggested messages using the distance to a conversation encoding vector may result in suggested messages that are highly similar to each other such as the following suggested messages: "Sure, I can help you with that"; "Happy to help you"; and "It would be my pleasure to assist you today." The suggested messages may be more useful if they have greater diversity in meaning, such as the suggested messages shown in FIG. 2.

Figure 7:
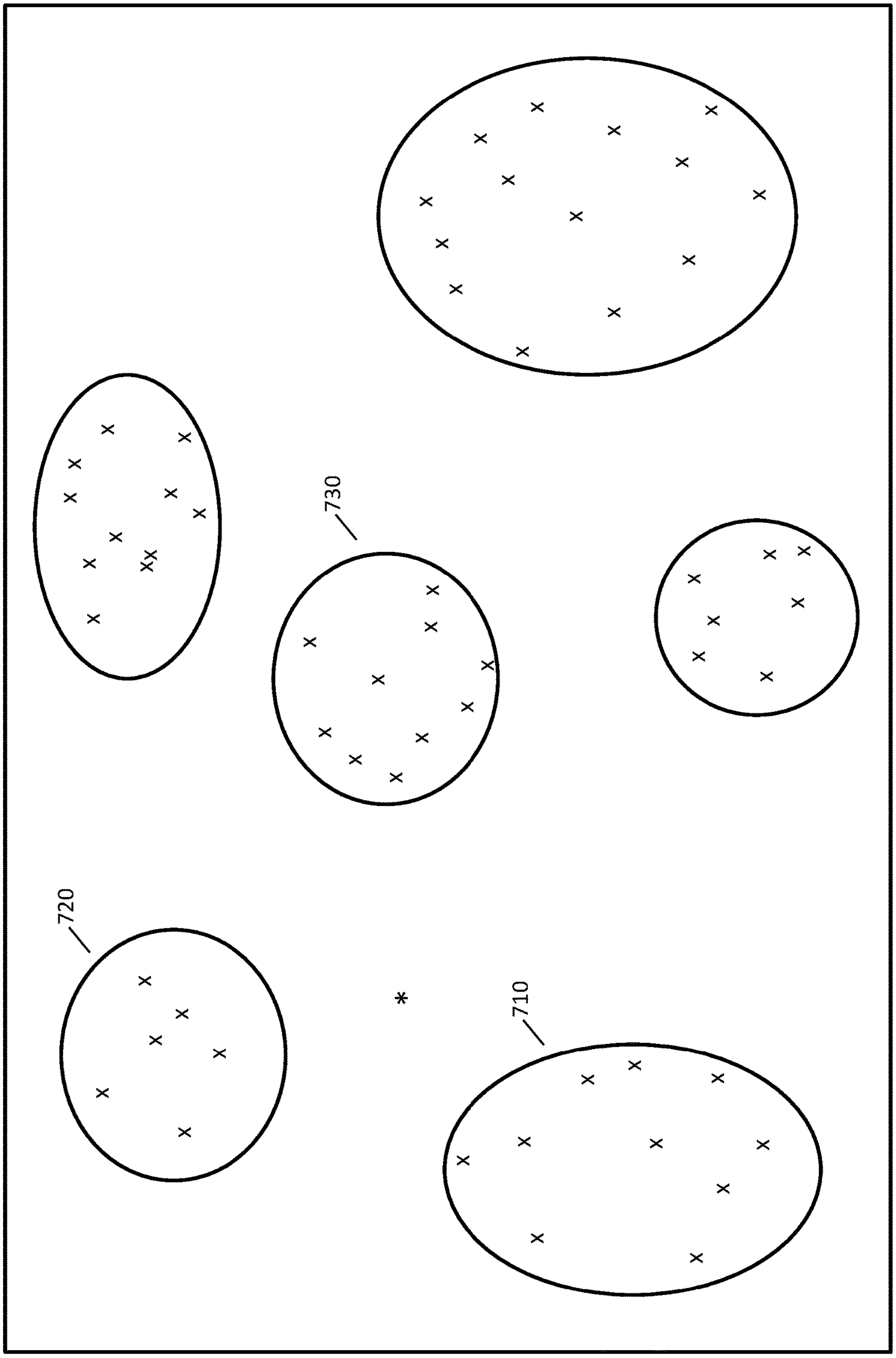
FIG. 7 illustrates a conceptual representation of a conversation encoding and clustered pre-approved message encodings in a vector space.

In some implementations, clustering techniques may be used to improve the selection of suggested messages. The set of pre-approved messages shown in FIG. 3, may be clustered into a number of clusters, such as shown in FIG. 7. Any appropriate techniques may be used to cluster the pre-approved messages, such as manual clustering by a person or automated clustering using techniques such as k-means clustering or density-based clustering.

In FIG. 7, for example, cluster 710 may include pre-approved messages relating to turning things off and on again, cluster 720 may include pre-approved messages relating to offering to assist with a problem, and cluster 730 may include pre-approved messages relating to asking for more information about a problem. To obtain greater diversity, it may be desired to select a pre-approved message from a number of closest clusters instead of selecting closest pre-approved messages regardless of the cluster they are in.

Figure 8:
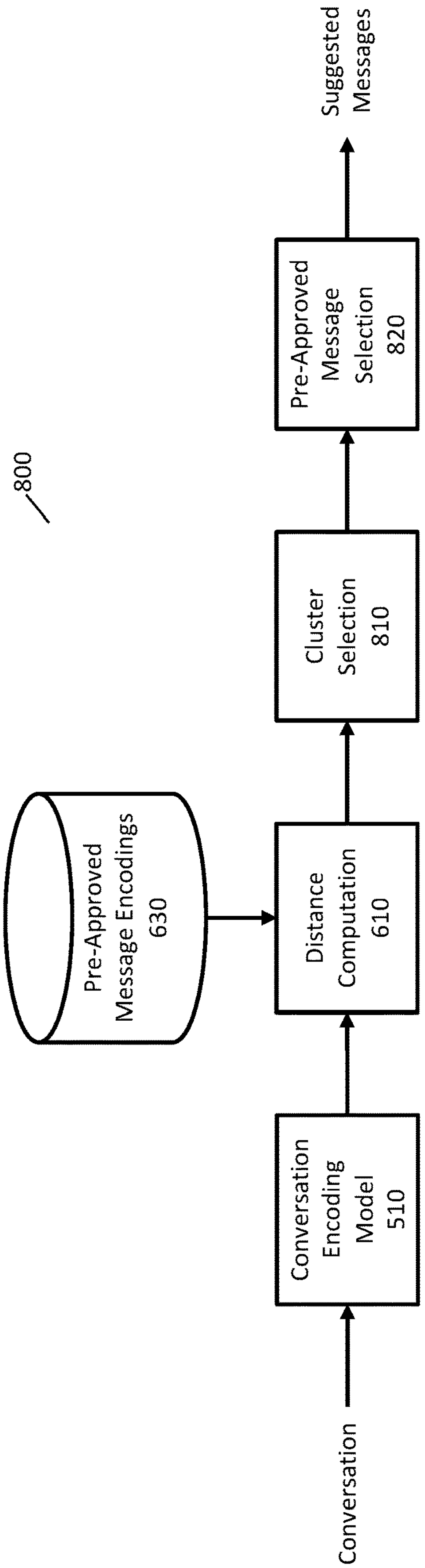
FIG. 8 is an example message suggestion system implemented using clusters of pre-approved message encodings.

FIG. 8 is an example message suggestion system 800 implemented using clusters of pre-approved message encodings. Message suggestion system 800 may be implemented in a similar manner as system 600 with the addition of using clusters of pre-approved messages. In FIG. 8, conversation encoding model 510, distance computation component 610, and pre-approved message encodings data store 630 may be implemented as described for system 600.

In FIG. 8, cluster selection component 810 may receive the distances computed by distance computation component 610 and select one or more clusters of pre-approved messages. Cluster selection component 810 may use any appropriate techniques for selecting clusters, such as selecting a number of clusters that are closest to the conversation encoding vector or selecting all clusters within a specified distance to the conversation encoding vector. Any appropriate techniques may be used to compute a distance between the conversation encoding vector and a cluster, such as using the minimum distance to a pre-approved message encodings in the cluster, the maximum distance to a pre-approved message encodings in the cluster, the average distance to pre-approved message encodings in the cluster, or the distance to a centroid of the cluster.

Pre-approved message selection component 820 may receive the distances computed by distance computation component 610 and the clusters selected by cluster selection component 810. Pre-approved message selection component 820 may use these inputs to select one or more pre-approved messages as suggested messages for a user in the conversation. Pre-approved message selection component 820 may use any appropriate techniques for selecting pre-approved messages, such as selecting a number of pre-approved messages from each cluster that are closest to the conversation encoding vector (e.g., selecting a single closest pre-approved message from each cluster) or selecting all pre-approved messages from each cluster within a specified distance to the conversation encoding vector. The selected pre-approved messages may then be presented as suggestions to the user, such as shown in FIG. 2.

Figure 9:
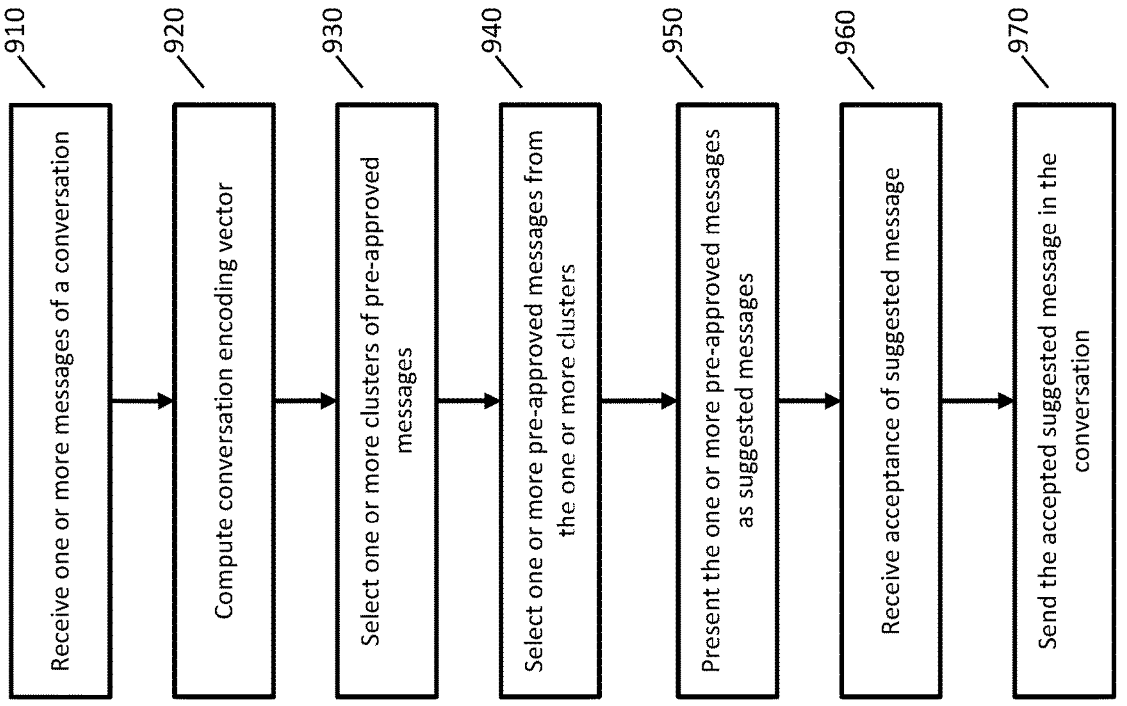
FIG. 9 is a flowchart of an example method for suggesting messages to a user in a conversation using clusters of pre-approved messages.

FIG. 9 is a flowchart of an example method for suggesting messages to a user in a conversation using clusters of pre-approved messages.

At step 910, one or more messages of a conversation are received. The messages may be received using any appropriate techniques, for any type of conversation (e.g., a customer support session between a customer and a customer support agent), and for any number of users in the conversation.

At step 920, a conversation encoding vector is computed for the one or more messages. In some implementations, the conversation encoding vector may be computed by processing the one or more messages of the conversation with a neural network, such as any of the neural networks described herein. The conversation encoding vector may be computed using any appropriate techniques, such as any of the techniques described herein.

At step 930, one or more clusters of pre-approved messages are selected using the conversation encoding vector and the pre-approved message encodings of the clusters. In some implementations, the pre-approved message encodings of the clusters may be computing by processing corresponding messages with a neural network, such as any of the neural networks described herein. Any appropriate techniques may be used. In some implementations, a distance may be computed between the conversation encoding vector and a cluster. This distance need not be a mathematical distance, but may be any number that indicates a closeness between the conversation encoding vector and the cluster. The distance between the conversation encoding vector and a cluster may be computed using the distances (e.g., Euclidean distances) between the conversation encoding vector and the pre-approved message encodings of the cluster, such as the minimum, average, or maximum distance.

At step 940, one or more pre-approved messages are selected from the one or more clusters as suggested messages for a user in the conversation. Any appropriate techniques may be used to select the pre-approved messages. In some implementations, a single pre-approved message may selected from each cluster that is closest to the conversation encoding vector. In some implementations, more than one message may be selected from a cluster such as selecting a number of pre-approved messages closest to the conversation encoding vector or all pre-approved messages within a threshold distance to the conversation encoding vector.

At step 950, the one or more selected pre-approved messages are presented as suggested messages to a user in the conversation. The suggested messages may be presented using any appropriate techniques, such as shown in FIG. 2.

At step 960, acceptance of a suggested message is received from the user. The acceptance may be indicated and received using any appropriate techniques. For example, the user may click or tap on a suggested message and software of the user interface may process the click or tap and transmit an indication of the acceptance of a message (e.g., using an API call).

At step 970, the accepted suggested message is sent in the conversation as a message from the user.

In some implementations, it may be desired to customize or adapt the message suggestions to the preferences of an individual user or to other factors, such as the time of day. Different users may have different writing styles or preferences in sending messages and accordingly suggested messages that suitable for one user may not be suitable for another user. Adapting messages to other factors may also improve the quality of suggested messages, such as suggesting "Good morning" in the morning and "Good afternoon" in the afternoon.

A message suggestion system may be adapted by processing features (referred to as adaptive features) that are specific to a user or other desired factors, such as a time of day. Any appropriate features may be used. The following are non-limiting examples of features that may be used: a user ID (e.g., any string or number that identifies the user); a number of characters or tokens in a pre-approved message (some users may prefer shorter or longer messages); the frequency a pre-approved message is selected when suggested; the frequency a pre-approved message is selected when suggested to a specific user; that a pre-approved message is a custom pre-approved message of a user; the frequency that a cluster is used by any user when suggested; the frequency that a cluster is used by a specific user when suggested; an amount of time since the most recent message in the conversation; the number of messages in the conversation so far; whether the previous message ends with a question mark; the number of pre-approved messages in a cluster; time of day; day of week; day of month; month of year; an indication of current weather; gender of user; age of user; or a sentiment of one or more messages in the conversation.

Figure 10:
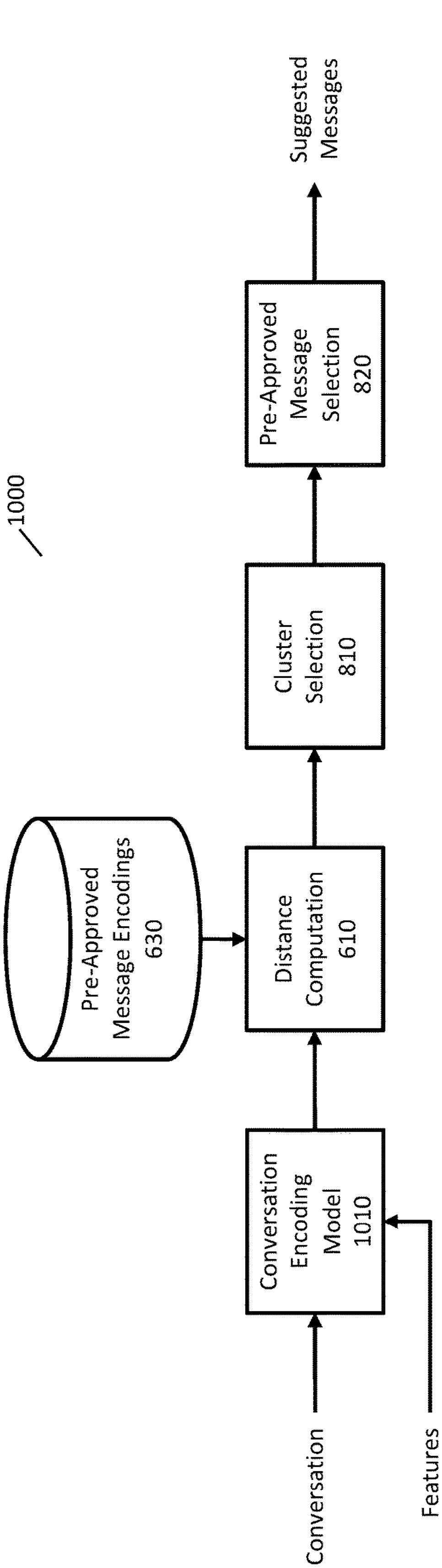
FIG. 10 is an example adaptive message suggestion system implemented with a neural network that processes adaptive features.

FIG. 10 is an example adaptive message suggestion system 1000 implemented with a neural network that processes adaptive features. Adaptive message suggestion system 1000 may be implemented in a similar manner as system 800 with the addition of the processing of adaptive features by a neural network. In FIG. 10, distance computation component 610, pre-approved message encodings data store 630, cluster selection component 810, and pre-approved message selection component 820 may be implemented as described for system 800.

In FIG. 10, conversation encoding model 1010 may be different from conversation encoding model 510 in that conversation encoding model 1010 processes the adaptive features in addition to the conversation. Conversation encoding model 1010 may process any appropriate adaptive features, such as any of the features described herein. Conversation encoding model 1010 may be trained so that the computed conversation encoding vector is adapted to the adaptive features. For example, the computed conversation encoding vector may be closer to pre-approved messages preferred by the user or that are a better match to the conversation as indicated by the adaptive features (e.g., time of day).

In some implementations, it may be desired to retrain an adaptive message suggestion system relatively frequently, such as once a day. For example, new training, new configurations, or new feedback from users may be received on a regular basis and it may be desired to use this new information to improve the adaptive message suggestion system. Retraining the adaptive message suggestion system may include retraining conversation encoding model 1010, which may be implemented using a neural network.

Figure 12:
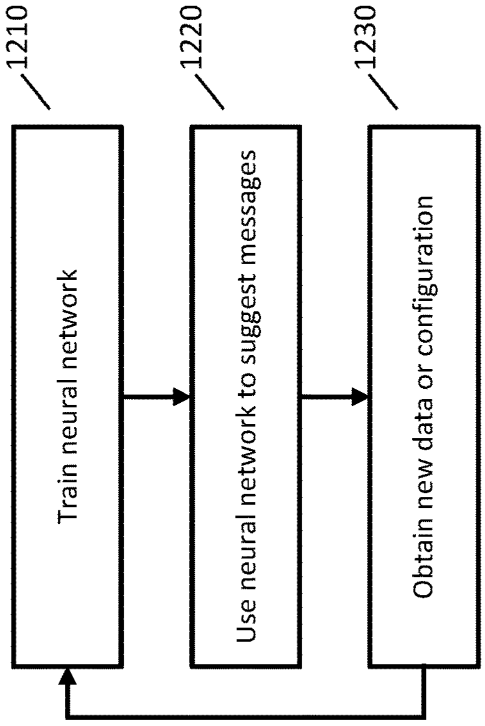
FIG. 12 is an example flowchart for retraining an adaptive message suggestion system where adaptive features are processed by a neural network.

FIG. 12 is an example flowchart for retraining an adaptive message suggestion system where adaptive features are processed by a neural network. At step 1210, a neural network of the message suggestion system (e.g., conversation encoding model 1010) is trained. At step 1220, the neural network is used to suggest messages, such as shown in adaptive message suggestion system 1000. At step 1230, new data or configuration is received, and the process is repeated using the new data or configuration.

One disadvantage of frequent retraining of a neural network may be that significant computational or other resources are required. In some implementations, a neural network may require a longer period of time to train (e.g., one week), and it may not be feasible to retrain the neural network frequently.

To allow more frequent retraining of an adaptive message suggestion system, the adaptive features may be used with a model that requires less computational resources for retraining.

Figure 11:
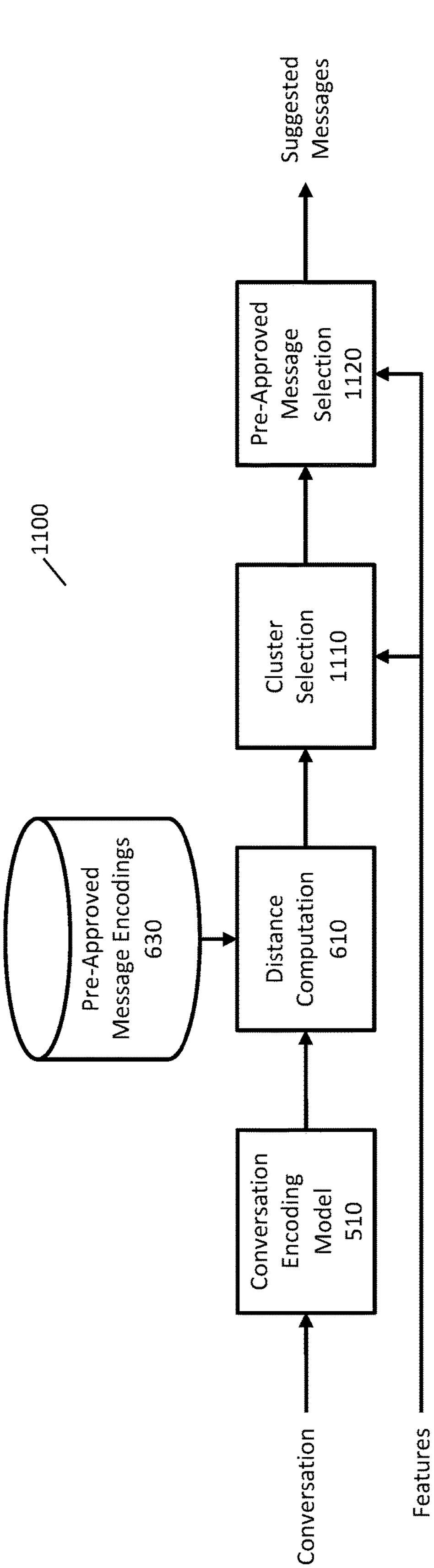
FIG. 11 is an example adaptive message suggestion system where adaptive features are processed outside of a neural network.

FIG. 11 is an example adaptive message suggestion system 1100 where adaptive features are processed outside of a neural network. Adaptive message suggestion system 1100 may be implemented in a similar manner as system 800 with the addition of the processing of adaptive features outside of a neural network. In FIG. 11, conversation encoding model 510, distance computation component 610, and pre-approved message encodings data store 630 may be implemented as described for system 800.

In FIG. 11, cluster selection component 1110 may receive the adaptive features as input in addition to the distances computed by distance computation component 610. Cluster selection component 1110 may use the adaptive features to select clusters that are a better match to the conversation as indicated by the adaptive features. Cluster selection component 1110 may select the clusters using any appropriate model and any appropriate techniques. In some implementations, cluster selection component 1110 may use a probabilistic graphical model (such as a tree-based model) or a support vector machine to select clusters using the adaptive features and distances.

As used herein, a probabilistic graphical model is a mathematical model that represents random variable relationships using a graph. Examples of probabilistic graphical models include Bayesian networks, Markov random fields, and tree-based models, such as any of the tree-based models described herein.

Pre-approved message selection component 1120 may receive the distances computed by distance computation component 610, the clusters selected by cluster selection component 1110, and the adaptive features. Pre-approved message selection component 1120 may use these inputs to select one or more pre-approved messages as suggested messages for a user in the conversation. Pre-approved message selection component 1120 may use the adaptive features to select pre-approved messages that are a better match to the conversation as indicated by the adaptive features. Pre-approved message selection component 1120 may select the pre-approved messages using any appropriate model and any appropriate techniques. In some implementations, pre-approved message selection component 1120 may use a probabilistic graphical model (such as a tree-based model) or a support vector machine to select pre-approved messages using the adaptive features, clusters, and distances. The selected pre-approved messages may then be presented as suggestions to the user, such as shown in FIG. 2.

Retraining of system 1100 may be more efficient than retraining of system 1000. Because the adaptive features are processed outside of the neural network, the neural network need not be retrained and other portions of system 1100 (such as tree-based models) may instead be retrained that require less resources for retraining.

For clarity of presentation, the following will use a tree-based model as an example of a model that may be used to select clusters and pre-approved messages. In some implementations, other models may be used instead of a tree-based model, such as a different probabilistic graphical model or a support vector machine.

Figure 13:
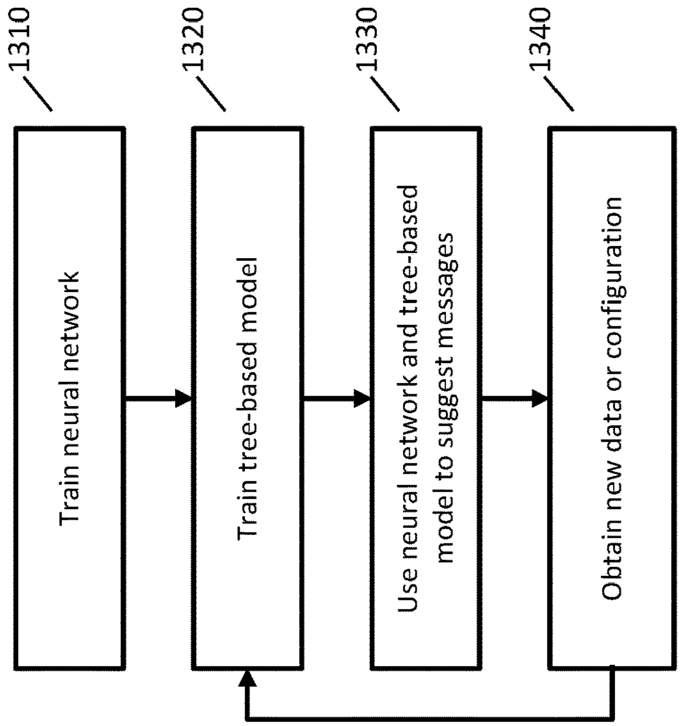
FIG. 13 is an example flowchart for retraining an adaptive message suggestion system where adaptive features are processed outside of a neural network.

FIG. 13 is an example flowchart for retraining an adaptive message suggestion system where adaptive features are processed outside of a neural network. At step 1310, a neural network of the message suggestion system (e.g., conversation encoding model 510) is trained. At step 1320, one or more tree-based models are trained where the tree-based models process the adaptive features. At step 1330, the neural network and tree-based models are used to suggest messages, such as shown in adaptive message suggestion system 1100. At step 1340, new data or configuration is received. Since the neural network is independent of the adaptive features, it need not be retrained, and instead the tree-based models are retrained using the new data or configuration.

A tree-based model may be used with one or both of cluster selection component 1110 and pre-approved message selection component 1120. A tree-based model may process distances computed by distance computation component 610 and adaptive features to select clusters and/or pre-approved messages from clusters.

As used herein, a tree-based model includes any mathematical model that includes a tree data structure in processing data to determine model outputs. A tree-based model may include any of the following and combinations thereof: a decision tree, an ensemble of decision trees, bagging or bootstrap aggregation with an ensemble of decision trees, a random forest, boosting with an ensemble of decision trees, or gradient boosting with an ensemble of decision trees. For example, in some implementations, an extreme gradient boosting algorithm or XGBoost may be used to train an ensemble of decision trees.

Figure 14A:
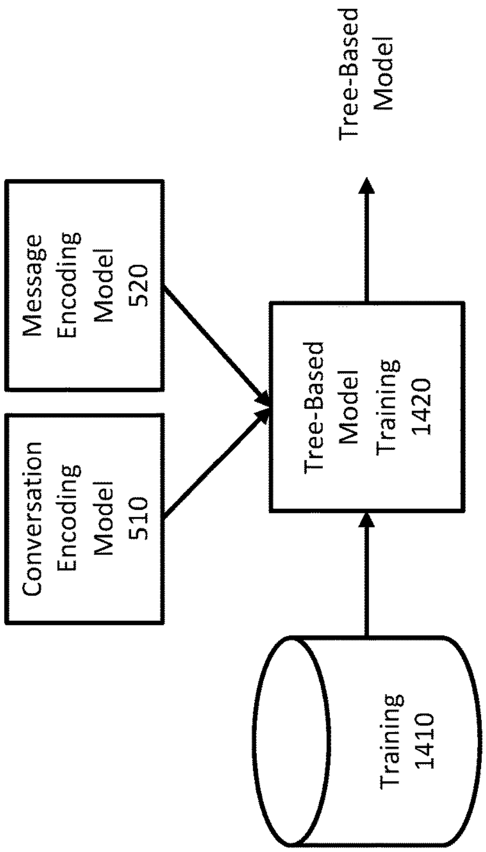
FIG. 14A is an example system for training a tree-based model.

FIG. 14A is an example system for training a tree-based model, such as any of the tree-based models described herein. In FIG. 14A, tree-based model training component 1420 processes training data from training data store 1410 to generate a tree-based model that may be used to select clusters of pre-approved messages or to select pre-approved messages. Tree-based model training component 1420 may use any appropriate data to generate a tree-based model, such as any of the distance features or adaptive features described herein.

Training data store 1410 may include any appropriate training data to train a tree-based model. In some implementations, training data store 1410 may include data from actual conversations, such as a sequence of messages in the conversation, the adaptive features corresponding to the conversation, a conversation encoding vector after each message in the conversation, a message encoding for each message in the conversation, and adaptive features corresponding to any of the conversation, users in the conversation, individual messages in the conversation, or any other factors.

Tree-based model training component 1420 may obtain distance features from training data store 1410 or compute distance features from data in training data store 1410. Tree-based model training component 1420 may have access to conversation encoding model 510 and/or message encoding model 520 to compute conversation encoding vectors and message encoding vectors. For example, when training a tree-based model for selecting clusters, the distance features may include the distance from each pre-approved message in the cluster to the conversation encoding vector or the minimum, maximum, average or any other statistic of distances of pre-approved messages in the cluster to the conversation encoding vector. For example, when training a tree-based model for selecting a pre-approved message in a cluster, the distance feature may be the distance between the conversation encoding vector and the message encoding vector for the actual next message in the conversation. Tree-based model training component 1420 may use any appropriate training techniques.

Figure 14B:
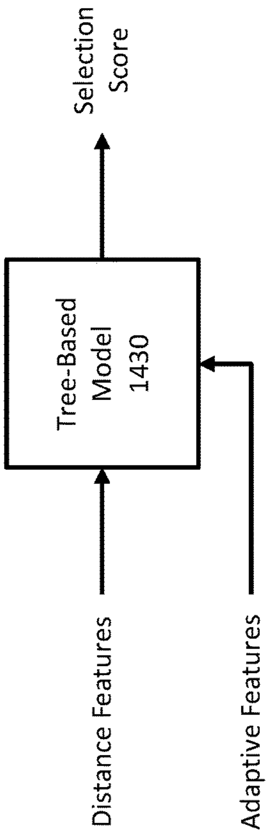
FIG. 14B is an example implementation of a tree-based model.

FIG. 14B is an example implementation of a tree-based model using distance features and adaptive features. Tree-based model 1430 may process any appropriate features, such as one or more distance features relating to distances between a conversation encoding vector and a message encoding vector and one or more adaptive features. In some implementations, adaptive features may include any features that are not computed using a distance between a conversation encoding vector and a message encoding vector. Tree-based model 1430 may process the distance features and adaptive features to compute a selection score, such as a selection score for a cluster of pre-approved messages or a selection score for an individual pre-approved message.

The selection scores computed by tree-based model 1430 may then be used by other components for making selections. For example, cluster selection component 1110 may use the selection scores to select a cluster of pre-approved messages and pre-approved message selection component 1120 may use the selection scores to select a pre-approved message from a cluster.

Figure 15:
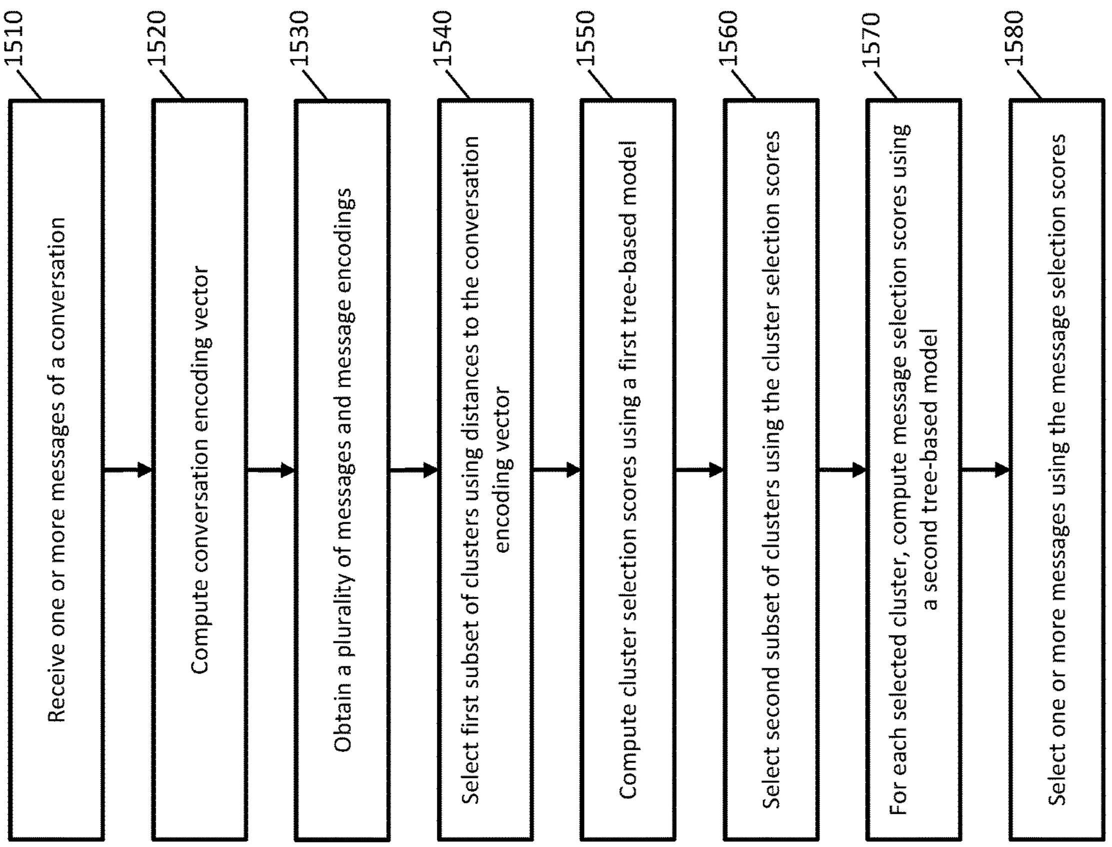
FIG. 15 is a flowchart of an example method for selecting one or more pre-approved messages as suggested messages in a conversation.

FIG. 15 is a flowchart of an example method for selecting one or more messages as suggested messages in a conversation.

At step 1510, one or more conversation messages of a conversation are received between a first user and a second user. At step 1520, a conversation encoding vector is computed using the one or more conversation messages. These two steps may be performed using any of the techniques described herein, such as described at step 910 and step 920 of FIG. 9.

At step 1530, a plurality of clusters of messages are obtained, such as clusters of pre-approved messages. The messages may be pre-approved for use as suggested messages in a message suggestion application or system. The plurality of clusters may include a first cluster and a second cluster. The first cluster may include a first message and a second message. The second cluster may include a third message and a fourth message. Message encoding vectors may also be obtained for the messages. The message encoding vectors may be computed in advance so that they need not be computed while suggesting messages for users. For example, the message encoding vectors may be computed in advance of the deployment of a message suggestion system using the clusters of messages.

At step 1540, a first subset of clusters may be selected using distances between the conversation encoding vector and messages in the clusters. This step is optional and may not be performed in all implementations. Where this step is implemented, it may reduce processing requirements by eliminating clusters that are likely not a good match for the current state of the conversation (e.g., a cluster relating to closing messages in the beginning of the conversation).

In some implementations, a message distance may be computed for each message by computing a distance between the conversation encoding vector and the corresponding message encoding vector. A cluster distance between the conversation encoding vector and a cluster may be determined using the message distances of the messages in the cluster and using any appropriate techniques. For example, the cluster distance may be the smallest, average, or largest message distance of the messages in the cluster.

The first subset of clusters may then be selected using the cluster distances. For example, a number of clusters with the smallest cluster distances may be selected or all clusters with a cluster distance less than a threshold may be selected. In some implementations, hierarchical clustering techniques may be used to reduce computational requirements.

At step 1550, cluster selection scores are computed using a first tree-based model. Any appropriate techniques and any appropriate tree-based model may be used to compute the cluster selection scores. In some implementations, the first tree-based model may process two or more types of features.

A first type of features may be computed from message and/or cluster distances. For example, the first type of features may include any of the following: a minimum, average, or maximum message distance of the messages in the cluster; a ranking of a message distance or cluster distance across other clusters; or any other distance features described herein.

A second type of features may be independent of conversation encoding vector (and also independent of the message and/or cluster distances). For example, the second type of features may include any of the following: an identifier of a person in the conversation; a time of day; or any of the other features described herein that do not depend on message and/or cluster distances, such as the adaptive features.

For example, a first cluster selection score may be computed for the first cluster using one or more of the following: a first message distance between the first message encoding vector and the conversation encoding vector, a second message distance between the second message encoding vector and the conversation encoding vector, and features that are computed independently of conversation encoding vector. A second cluster selection may be computed for the second cluster using one or more of the following: a third message distance between the third message encoding vector and the conversation encoding vector, a fourth message distance between the fourth message encoding vector and the conversation encoding vector, and features that are computed independently of the conversation encoding vector.

Where step 1540 is performed, a cluster selection score may be computed for each cluster in the first subset of clusters. Where step 1540 is not performed, a cluster selection score may be computed for each cluster.

At step 1560, a second subset of clusters is selected using the cluster selection scores. Any appropriate techniques may be used to select the second subset of clusters using the cluster selection scores. For example, a number of clusters with the largest selection scores may be selected or all clusters with a cluster selection score larger than a threshold may be selected.

At step 1570, message selection scores are computed for messages in each of the clusters in the second subset of clusters using a second tree-based model. For example, in some implementations, a message selection score may be computed for each message in each of the clusters in the second subset of clusters. Any appropriate techniques and any appropriate tree-based model may be used to compute the cluster selection scores.

In some implementations, the second tree-based model may process two or more types of features, such as the feature types described above at step 1550. For example, when computing a message selection score for a message, the first type of feature may include the message distance for that message.

For example, a first message selection score may be computed for the first message using one or more of the following: the first message distance between the first message encoding vector and the conversation encoding vector and features that are computed independently of the conversation encoding vector. For example, a second message selection score may be computed for the second message using one or more of the following: the second message distance between the second message encoding vector and the conversation encoding vector and features that are computed independently of the conversation encoding vector.

At step 1580, one or more messages are selected using the message selection scores. Any appropriate techniques may be used to select the messages using the message selection scores. For example, a number of messages with the largest selection scores may be selected or all messages with a message selection score larger than a threshold may be selected.

In some implementations, it may be desired to obtain greater diversity among the selected messages by explicitly selecting messages from different clusters. For example, a highest scoring message may be selected from each cluster of the second subset of clusters. For another example, a number of messages with the largest selection scores may be selected subject to the constrained that they are in different clusters.

The selected messages may then be used as suggested messages as described herein. For example, the selected messages may be presented as shown in FIG. 2 and as described in FIG. 9.

Figure 16:
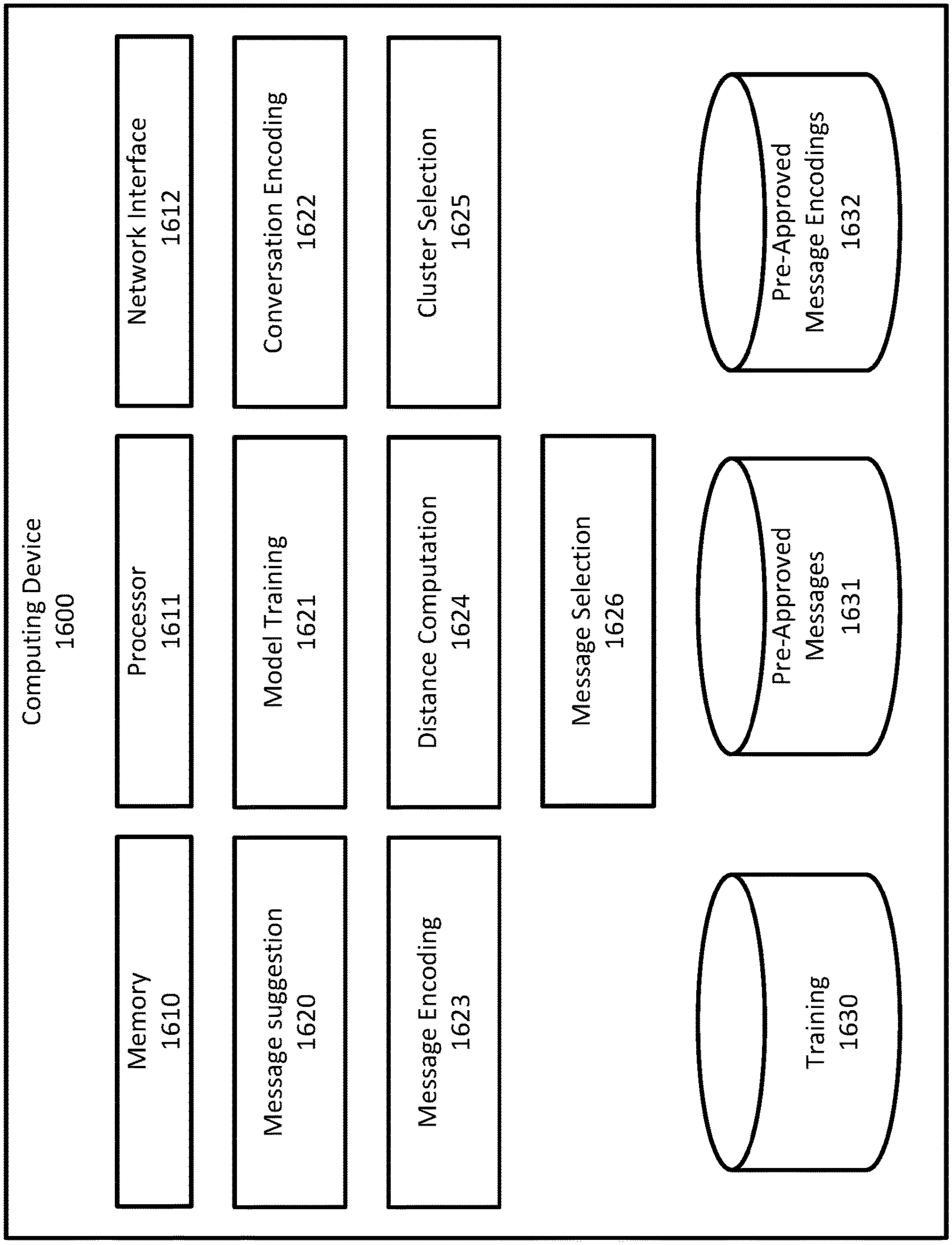
FIG. 16 illustrates components of an example computing device for suggesting messages in a conversation.

FIG. 16 illustrates components of one implementation of a computing device 1600 for implementing any of the techniques described herein. In FIG. 16, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1600 may include any components typical of a computing device, such as volatile or nonvolatile memory 1610, one or more processors 1611, and one or more network interfaces 1612. Computing device 1600 may also include any input and output components, such as displays, keyboards, and touch screens. Computing device 1600 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1600 may have a message suggestion component 1620 that may interface with a messaging system and other components to suggest messages to users participating in conversations. Computing device 1600 may have a model training component 1621 that may train neural networks, tree-based models, and any other models described herein using any of the techniques described herein. Computing device 1600 may have a conversation encoding component 1622 that may process one or messages in a conversation to compute a conversation encoding vector using any of the techniques described herein. Computing device 1600 may have a message encoding component 1623 that may process a message or a pre-approved message to compute a message encoding vector using any of the techniques described herein. Computing device 1600 may have a distance computation component 1624 that may compute a distance between a conversation encoding vector and a message or a cluster using any of the techniques described herein. Computing device 1600 may have a cluster selection component 1625 that may select a cluster using any of a tree-based model, distance-based features, and features independent of the conversation encoding vector and using any of the techniques described herein. Computing device 1600 may have a message selection component 1626 that may select a pre-approved using any of a tree-based model, distance-based features, and features independent of the conversation encoding vector and using any of the techniques described herein.

Computing device 1600 may include or have access to various data stores. Data stores may use any known storage technology such as files, relational databases, non-relational databases, or any non-transitory computer-readable media. Computing device 1600 may have a training data store 1630 that stores training data that may be used to train and of the mathematical models described herein. Computing device 1600 may have a pre-approved messages data store 1631 that may store pre-approved messages that may be used as suggested messages in a conversation. Computing device 1600 may have a pre-approved message encodings data store 1632 that may store pre-approved message encodings that may be used to select pre-approves messages as suggested messages in a conversation.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A system, comprising:

at least one server computer comprising at least one processor and at least one memory, the at least one server computer configured to:

obtain one or more conversation messages from a conversation between a first user and a second user;

compute a conversation encoding vector by processing the one or more conversation messages with a neural network;

obtain a plurality of clusters of pre-approved message suggestions, wherein:

the plurality of clusters comprises a first cluster and a second cluster, the first cluster comprises a first pre-approved message suggestion and a second pre-approved message suggestion, and the second cluster comprises a third pre-approved message suggestion and a fourth pre-approved message suggestion;

obtain message encoding vectors for the pre-approved message suggestions, wherein a message encoding vector is computed by processing a corresponding pre-approved message suggestion with the neural network;

compute a first distance between the conversation encoding vector and a first message encoding vector corresponding to the first pre-approved message suggestion;

compute a second distance between the conversation encoding vector and a second message encoding vector corresponding to the second pre-approved message suggestion;

compute a third distance between the conversation encoding vector and a third message encoding vector corresponding to the third pre-approved message suggestion;

compute a fourth distance between the conversation encoding vector and a fourth message encoding vector corresponding to the fourth pre-approved message suggestion;

compute a first cluster selection score for the first cluster by processing a first feature with a first tree-based model, wherein the first feature is computed using at least one of the first distance or the second distance;

compute a second cluster selection score for the second cluster by processing a second feature with the first tree-based model, wherein the second feature is computed using at least one of the third distance or the fourth distance;

select the first cluster using the first cluster selection score and the second cluster selection score;

compute a first message selection score by processing the first distance with a second tree-based model, wherein the second tree-based model is different than the first tree-based model;

compute a second message selection score by processing the second distance with the second tree-based model;

select the first pre-approved message suggestion using the first message selection score and the second message selection score; and presenting the first pre-approved message suggestion to the first user as a suggested message to send to the second user.

2. The system of claim 1, wherein the at least one server computer is configured to:

select the second cluster;

select the third pre-approved message suggestion from the second cluster; and presenting the third pre-approved message suggestion to the first user as the suggested message to send to the second user.

3. The system of claim 1, wherein the message encoding vectors are computed in advance and obtained from storage.

4. The system of claim 1, wherein the neural network comprises a conversation encoding model and a message encoding model.

5. The system of claim 1, wherein the conversation encoding vector is computed by sequentially processing tokens of the one or more conversation messages with a recurrent neural network.

6. The system of claim 1, wherein the first feature comprises one or more of:

a minimum distance between the conversation encoding vector and message encodings of the first cluster;

a maximum distance between the conversation encoding vector and the message encodings of the first cluster; or an average distance between the conversation encoding vector and the message encodings of the first cluster.

7. A computer-implemented method for suggesting a message, comprising:

obtaining one or more conversation messages from a conversation between a first user and a second user;

computing a conversation encoding vector by processing the one or more conversation messages with a neural network;

obtaining a plurality of clusters of pre-approved message suggestions, wherein:

the plurality of clusters comprises a first cluster and a second cluster, the first cluster comprises a first pre-approved message suggestion and a second pre-approved message suggestion, and the second cluster comprises a third pre-approved message suggestion and a fourth pre-approved message suggestion;

obtaining message encoding vectors for the pre-approved message suggestions, wherein a message encoding vector is computed by processing a corresponding pre-approved message suggestion with the neural network;

computing a first distance between the conversation encoding vector and a first message encoding vector corresponding to the first pre-approved message suggestion;

computing a second distance between the conversation encoding vector and a second message encoding vector corresponding to the second pre-approved message suggestion;

computing a third distance between the conversation encoding vector and a third message encoding vector corresponding to the third pre-approved message suggestion;

computing a fourth distance between the conversation encoding vector and a fourth message encoding vector corresponding to the fourth pre-approved message suggestion;

computing a first cluster selection score for the first cluster by processing a first feature with a first probabilistic graphical model, wherein the first feature is computed using at least one of the first distance or the second distance;

computing a second cluster selection score for the second cluster by processing a second feature with the first probabilistic graphical model, wherein the second feature is computed using at least one of the third distance or the fourth distance;

selecting the first cluster using the first cluster selection score and the second cluster selection score;

computing a first message selection score by processing the first distance with a second probabilistic graphical model, wherein the second probabilistic graphical model is different than the first probabilistic graphical model;

computing a second message selection score by processing the second distance with the second probabilistic graphical model; and selecting the first pre-approved message suggestion using the first message selection score and the second message selection score.

8. The computer-implemented method of claim 7, wherein the first cluster selection score is computed by processing a third feature with the first probabilistic graphical model.

9. The computer-implemented method of claim 8, wherein the third feature is independent of the conversation encoding vector.

10. The computer-implemented method of claim 8, wherein the third feature comprises a frequency of use of the first cluster by any user when suggested; a frequency of use of the first cluster by the first user when suggested; an amount of time since a most recent message in the conversation; or a number of messages in the conversation.

11. The computer-implemented method of claim 7, wherein the first message selection score is computed by processing a third feature with the second probabilistic graphical model.

12. The computer-implemented method of claim 11, wherein the third feature is independent of the conversation encoding vector.

13. The computer-implemented method of claim 12, wherein the third feature comprises a time of day; a sentiment of the one or more conversation messages; or an indication of current weather.

14. The computer-implemented method of claim 7, wherein the first probabilistic graphical model comprises a tree-based model.

15. One or more non-transitory, computer-readable media comprising computer-executable instructions that, when executed, cause at least one processor to perform actions comprising:

obtaining one or more conversation messages from a conversation between a first user and a second user;

computing a conversation encoding vector by processing the one or more conversation messages with a neural network;

obtaining a plurality of clusters of pre-approved message suggestions, wherein:

the plurality of clusters comprises a first cluster and a second cluster, the first cluster comprises a first pre-approved message suggestion and a second pre-approved message suggestion, and the second cluster comprises a third pre-approved message suggestion and a fourth pre-approved message suggestion;

obtaining message encoding vectors for the pre-approved message suggestions, wherein a message encoding vector is computed by processing a corresponding pre-approved message suggestion with the neural network;

computing a first distance between the conversation encoding vector and a first message encoding vector corresponding to the first pre-approved message suggestion;

computing a second distance between the conversation encoding vector and a second message encoding vector corresponding to the second pre-approved message suggestion;

computing a third distance between the conversation encoding vector and a third message encoding vector corresponding to the third pre-approved message suggestion;

computing a fourth distance between the conversation encoding vector and a fourth message encoding vector corresponding to the fourth pre-approved message suggestion;

computing a first cluster selection score for the first cluster by processing a first feature with a first tree-based model, wherein the first feature is computed using at least one of the first distance or the second distance;

computing a second cluster selection score for the second cluster by processing a second feature with the first tree-based model, wherein the second feature is computed using at least one of the third distance or the fourth distance;

selecting the first cluster using the first cluster selection score and the second cluster selection score;

computing a first message selection score by processing the first distance with a second tree-based model, wherein the second tree-based model is different than the first tree-based model;

computing a second message selection score by processing the second distance with the second tree-based model; and selecting the first pre-approved message suggestion using the first message selection score and the second message selection score.

16. The one or more non-transitory, computer-readable media of claim 15, wherein the first tree-based model comprises an ensemble of decision trees or a random forest.

17. The one or more non-transitory, computer-readable media of claim 15, wherein the first tree-based model is implemented using gradient boosting or bagging.

18. The one or more non-transitory, computer-readable media of claim 15, wherein the first user is a customer support agent and the second user is a customer.

19. The one or more non-transitory, computer-readable media of claim 15, wherein the first tree-based model and the second tree-based model are retrained more frequently than the neural network.

* * * * *